US010494002B2

(12) United States Patent
Thomas et al.

(10) Patent No.: US 10,494,002 B2
(45) Date of Patent: Dec. 3, 2019

(54) RAILWAY BRAKING SYSTEM FOR A RAILWAY VEHICLE (71) Applicant: FAIVELEY TRANSPORT AMIENS, Amiens (FR)

(72) Inventors: Didier Thomas, Millencourt (FR); Guillaume Crosnier, Rosieres En Santerre (FR)

(73) Assignee: FAIVELEY TRANSPORT AMIENS, Amiens (FR)

( * ) Notice: Subject to any disclaimer, the term of this patent is extended or adjusted under 35 U.S.C. 154(b) by 35 days.

(21) Appl. No.: 15/575,023

(22) PCT Filed: Jun. 3, 2016

(86) PCT No.: PCT/FR2016/051331
§ 371 (c)(1),
(2) Date: Nov. 17, 2017

(87) PCT Pub. No.: WO2016/193639
PCT Pub. Date: Dec. 8, 2016

(65) Prior Publication Data
US 2018/0148075 A1 May 31, 2018

(30) Foreign Application Priority Data
Jun. 5, 2015 (FR) ..................................... 15 55131

(51) Int. Cl.
*B61H 5/00* (2006.01)
*B60T 13/66* (2006.01)
*B60T 17/22* (2006.01)
*B61H 13/00* (2006.01)
*B61H 13/20* (2006.01)
(Continued)

(52) U.S. Cl.
CPC ............ *B61H 13/34* (2013.01); *B60T 13/665* (2013.01); *B60T 17/228* (2013.01); *B61H 5/00* (2013.01);
(Continued)

(58) Field of Classification Search
CPC ..... B60T 13/665; B60T 17/228; B61H 11/14; B61H 5/00; F16D 55/2245; F16D 65/18;
(Continued)

(56) References Cited

U.S. PATENT DOCUMENTS 4,638,892 A * 1/1987 Wirth .................... B60T 17/081
188/212
4,918,922 A 4/1990 Nakano et al.
(Continued)

FOREIGN PATENT DOCUMENTS

DE 198 50 560 A1 5/2000
EP 0 186 767 A1 7/1986
(Continued)

OTHER PUBLICATIONS

International Search Report, dated Oct. 7, 2016, from corresponding PCT/FR2016/051331 application.

*Primary Examiner* — Robert A. Siconolfi
*Assistant Examiner* — San M Aung
(74) *Attorney, Agent, or Firm* — Young & Thompson (57) ABSTRACT

Disclosed is a railway braking system including a braking device provided with a body, a single piston that can move with respect to the body to act on a brake linkage, and delimiting, together with the body, a pressure chamber supplied by a pressure medium source for placing the piston in a rest position where the linkage applies no force on a braking member of a railway vehicle, first and second seals housed between a first section of the piston and the body, and third and fourth seals housed between a second section of the piston and the body; the first and third seals being configured to form a primary sealing of the pressure chamber and the second and fourth seals being configured to form a secondary sealing of the pressure chamber.

20 Claims, 7 Drawing Sheets

(51) Int. Cl.
    *B61H 13/34*    (2006.01)
    *F16D 65/18*    (2006.01)
    *F16D 121/04*   (2012.01)
    *F16D 125/04*   (2012.01)
    *F16D 125/06*   (2012.01)
    *F16D 125/08*   (2012.01)
    *F16D 125/58*   (2012.01)
    *F16D 55/224*   (2006.01)

(52) U.S. Cl.
    CPC ........... B61H 13/005 (2013.01); B61H 13/20 (2013.01); F16D 55/2245 (2013.01); F16D 65/18 (2013.01); *F16D 2121/04* (2013.01); *F16D 2125/04* (2013.01); *F16D 2125/06* (2013.01); *F16D 2125/08* (2013.01); *F16D 2125/585* (2013.01)

(58) Field of Classification Search
    CPC ............ F16D 2121/04; F16D 2121/08; F16D 2125/04; F16D 2125/06; F16D 2125/08; F16D 2125/585; F16D 2127/06
    USPC ...... 188/33, 72.6, 72.7, 59, 212, 216, 153 R
    See application file for complete search history.

(56) References Cited

U.S. PATENT DOCUMENTS

| 5,038,896 | A  | * | 8/1991  | Wirth ................... | B60T 17/083 188/153 R |
| 5,601,163 | A  | * | 2/1997  | Kent ..................... | B60T 15/02 188/170 |
| 8,851,243 | B2 | * | 10/2014 | Prescott ............... | B60T 17/083 188/153 R |
| 2014/0231192 | A1 | * | 8/2014 | Asano ..................... | B61H 1/00 188/74 |

FOREIGN PATENT DOCUMENTS

| EP | 2 154 040 A1 | 2/2010 |
| JP | 01203726 A * | 8/1989 |

* cited by examiner

RAILWAY BRAKING SYSTEM FOR A RAILWAY VEHICLE

FIELD OF THE INVENTION

The invention concerns the field of the braking of rail vehicles and more particularly the rail vehicle braking systems for a rail vehicle that are provided with a service brake and/or a parking brake configured to act on a braking linkage.

TECHNOLOGICAL BACKGROUND

Rail vehicles are generally equipped with service brake and/or parking brake calipers provided with a service brake and/or parking brake cylinder.

This cylinder comprises a brake piston movable under the effect of the action of one or more springs and furthermore movable under the effect of a fluid under pressure.

The displacement of the brake piston under the effect of the springs leads to a braking action such as the clamping of a brake disk between two linings, or the direct pressure of a block against a vehicle wheel.

On the contrary, the displacement of the braking piston under the effect of the fluid under pressure leads to an opposite action to the braking, i.e. the unclamping of the brake disk or the withdrawal of the block; and thereby enables the brake to be let off.

More specifically, this type of brake cylinder comprises a body in which and relative to which the brake piston is movable to act on the braking linkage via a thrust rod.

The brake cylinder also comprises a cavity formed in the body and provided to receive the springs, which is configured to place the braking piston in a braking position, via for example a bearing flange cooperating both with the spring and with the braking piston.

The brake cylinder further comprises a pressure chamber delimited in particular by the braking piston and by the body, and which is connected by a first pipe to a first source of pressure agent to return the piston into a resting position in which the brake is set but not applied.

To set the brake, the pressure chamber is supplied with pressure agent, also called fluid under pressure, via the corresponding source so as to displace the braking piston in the body.

The displacement of the braking piston towards its resting position leads to the displacement of the bearing flange against the load of the spring, which becomes compressed.

The brake cylinder is furthermore provided with a backup piston which is movable relative to the cylinder body.

This backup piston is adjacent the braking piston and delimits with it the pressure chamber.

More specifically, the braking piston has a head and a rod and the backup piston is formed by a body mounted on the rod and facing the head of the braking piston.

The brake cylinder further comprises a backup pressure chamber delimited by the backup piston and by the body, and which is connected by a second pipe to a second source of pressure agent, so as to displace the backup piston to push and return the braking piston into its resting position in which the brake is set but not applied.

The brake cylinder is provided with a first seal disposed between the head of the braking piston and the body of the cylinder, with a second seal disposed between the body of the backup piston and the rod of the braking piston, with a third seal disposed between the body of the backup piston and the body of the cylinder, and with a fourth seal disposed between the rod of the braking piston and the body of the cylinder.

In case of leakage defect in particular due to the defective character of the first seal, the resetting of the brake is ensured by the supply of the backup chamber with pressure agent via the corresponding source; so as to displace the backup piston which pushes and displaces the braking piston within the body until it reaches its resting position.

SUBJECT OF THE INVENTION

The invention concerns a rail vehicle braking system, having, in particular in terms of safety, improved performance relative to the braking system of the aforementioned prior art, while being simple, convenient and economical.

The invention thus relates to a rail vehicle braking system for a rail vehicle with braking members having at least one lining or at least one block, comprising a braking linkage configured to act on at least one said braking member, and a service and/or parking braking device provided with a body and an actuator which is movable relative to said body to act on said braking linkage; said rail vehicle braking system being characterized in that said actuator comprises a single braking piston having a first section having a first cross-section and a second section having a second cross-section greater than said first cross-section, said braking piston delimiting with said body a single pressure chamber configured to be supplied by at least one source of pressure agent to put said braking piston in a resting position in which said braking linkage applies no force on said at least one braking member, whereby said braking device is not applied; said rail vehicle braking system further comprising a first seal accommodated between said first section of said braking piston and said body, a second seal, distinct from said first seal, also accommodated between said first section of said braking piston and said body, a third seal accommodated between said second section of said braking piston and said body, and a fourth seal, distinct from said third seal, also accommodated between said second section of said braking piston and said body; said first and third seals being configured to form primary sealing of said pressure chamber and said second and fourth seals being configured to form secondary sealing of said pressure chamber.

In the braking system according to the invention, the braking piston is the single piston that enables the braking device to be reset. The pressure chamber is also the single pressure chamber that is supplied to enable the actuation of the single braking piston.

The braking system according to the invention is thus provided with a brake cylinder referred to as having a single pressure chamber and double sealing for that single pressure chamber.

By virtue of its configuration and in particular the fact of having, on one and the same braking piston and in one and the same pressure chamber, primary sealing and in addition secondary sealing, also referred to as backup sealing, the system makes it possible to mitigate leakage defects of the first and third seals forming the primary sealing.

This configuration in addition makes it possible to mechanically simplify the brake cylinder by having only a single braking piston, while having a particularly safe system by virtue of the double sealing.

As a matter of fact, having a single braking piston makes it possible to overcome possible problems of guiding between several coaxial pistons and/or of misalignment-related jamming.

The fact of having a single braking piston furthermore enables the rail vehicle braking system to be made particularly compact.

The system according to the invention therefore makes it possible to obtain a safety level at least equal to or possibly greater than that obtained with the aforementioned braking system of the prior art, in a way that is simple, convenient and economical.

According to preferred, simple, convenient and economical features of the system according to the invention:

said braking device is furthermore provided with a spring member accommodated in a cavity formed in said body and a bearing flange mechanically connected both to said spring member and to said braking piston; said spring member being configured for placing, without being acted upon externally and via said bearing flange, said braking piston in a braking position in which said braking linkage applies a force on said at least one braking member whereby said braking device is applied;

said first portion of said braking piston extends substantially longitudinally in said body and is mechanically connected to said braking linkage, and said braking piston further comprises a joining portion connecting said first section to said second section, which second section extends substantially opposite said first section so as to form an annular groove between said first section and said second section, said annular groove having a bottom formed by said joining portion;

at least one of the first and second seals is accommodated at the location of the annular groove and/or opposite said second section;

said braking device is configured such that at least one of said third and fourth seals is located at least partially superposed relative to said at least one of the first and second seals which is accommodated at the location of the annular groove, at least when said braking piston is in resting position;

said first and third seals are arranged so as to be at least partially superposed relative to each other and said second and fourth seals are arranged so as to be offset longitudinally relative to each other;

said fourth seal is adjacent said third seal and accommodated with a first side directed towards said joining portion, whereas said second seal is adjacent said first seal and accommodated with a second side away from said first side;

said first and third seals are similar and belong to a first family of seals, said second and fourth seals are similar and belong to a second family of seals, distinct from or identical to said first family of seals;

said first and second families of seals are preferably chosen from the families of composite seals, lip seals, 'O'-rings, lobed seals and so-called compact seals;

at least one of said first, second, third and fourth seals is situated in an accommodation formed in said body of said braking device;

at least one of said first and second seals is situated in an accommodation formed in said first section of said braking piston, and/or at least one of said third and fourth seals is situated in an accommodation formed in said second section of said braking piston;

said system comprises at least one first guide segment disposed between said first section and said body, and accommodated in a cavity formed in said first section or in said body; and at least one second guide segment disposed between said second section and said body, and accommodated in a cavity formed in said second section or in said body;

said body is provided with a single supply pipe opening into said pressure chamber, and said braking system further comprises a first source of hydraulic pressure agent and a second source of hydraulic pressure agent which are each configured to supply said pressure chamber via said supply pipe;

said system further comprises a hydraulic pressure agent supply network, comprising a single distribution circuit and a single distribution pipe which is connected by a first end to said distribution circuit and by a second end, which is an opposite end to said first end, to said supply pipe of said body; said supply network further comprising a primary branch configured for conveying a hydraulic pressure agent coming from said first source of pressure agent and provided with a pressure regulating device, a first hydraulic distribution device disposed in said distribution circuit and connected to said primary branch, a secondary branch configured for conveying a hydraulic pressure agent coming from said second source of pressure agent, a second hydraulic distribution device disposed in said distribution circuit and connected to said secondary branch; said first hydraulic distribution device being disposed between said second hydraulic distribution device and said pressure regulating device;

said first and second hydraulic distribution devices are each formed by a distributor provided with three apertures and a two-position slide which is electrically controlled by an actuator; and/or said main branch and/or said secondary branch are each supplied with hydraulic pressure agent by a hydraulic accumulator or by a hydraulic pump.

BRIEF DESCRIPTION OF THE DRAWINGS

The disclosure of the invention will now be continued with the description of embodiments, given below by way of non-limiting illustration, with reference to the accompanying drawings, in which.

DETAILED DESCRIPTION OF AN EMBODIMENT

FIGS. 1 to 6 diagrammatically represent a rail vehicle braking system 1 for a rail vehicle (not shown), in different operating configurations.

More specifically, the operating configurations in which are illustrated the rail vehicle braking system 1 in FIGS. 1 to 6 respectively represent a service braking configuration, a normal locomotion configuration, a configuration of locomotion with a sealing defect, an emergency braking configuration, a configuration of locomotion with a defect of the first source of hydraulic pressure agent, and a configuration of locomotion with a defect of the first source of hydraulic pressure agent and a sealing defect.

The rail vehicle braking system 1 comprises a service and/or parking braking device 2 (hereinafter brake) provided with a body 7 here forming a service and/or parking brake cylinder, a network 3 for supply of hydraulic pressure agent or agents connected to the body 7 via a single distribution pipe 4, a braking linkage 5 mechanically linked to the body 2 as well as a braking member 6 with linings upon which the braking linkage 5 is configured to act.

The body 7 here has the form of a generally closed envelope.

The brake 2 comprises an actuator which is formed here by a single braking piston 8 accommodated in a first cavity 10 formed in the body 7.

This braking piston 8 is movable relative to the body 7, in the first cavity 10, in a first axial direction.

The brake 2 further comprises a thrust rod 9 mounted at least partially movably in the first axial direction in the first cavity 10 and relative to the body 7.

The thrust rod 9 is mechanically connected to the braking piston 8 such that when the latter is displaced in the first axial direction, the thrust rod 9 is also displaced.

The brake 2 is furthermore provided with a spring member 11 accommodated in a second cavity 12 formed in the body 7 and with a bearing flange 13 mechanically connected both to the spring member 11 and to the braking piston 8.

The spring member 11 may be formed by one or more compression springs and the bearing flange 13 may for example have the form of a cup in which the spring member 11 is at least partially accommodated.

The bearing flange 13 is mechanically connected to a first end 15 of the braking piston 8 via a mechanical link interface 14, which may for example be formed by a system of teeth formations.

The spring member 11 is configured for placing, without being acted upon externally and via said bearing flange 13 of the interface 14, the braking piston 8 in a braking position in which the braking linkage 5 applies a force on the braking member with linings 6, whereby the brake 2 is applied.

The thrust rod 9 is provided with a wear adjuster (not shown) configured to compensate for the wear of the linings of the braking member 6 in order to avoid reduction of the braking force by excessive play (further to wear of the linings).

The body 7 is furthermore provided with a first aperture 16 configured to enable the displacement of the thrust rod 9 through this first aperture 16 and thus through the body 2.

Together with the body 7, the braking piston 8 delimits a single pressure chamber 17 configured to be supplied by the supply network 3.

The supply of the pressure chamber 17 with a hydraulic pressure agent or agents under a predetermined pressure makes it possible to place the braking piston 8 in a resting position, distinct from the braking position, in which the braking linkage 5 does not apply any force on the braking member with linings 6, whereby the brake 2 is not applied.

The body 7 is also provided with a single supply pipe 18 which emerges from the body 7 at a first end by a single inlet aperture 19, and which opens into the pressure chamber 17 at a second end, which is an opposite end to the first end, by a single outlet aperture 20.

The braking piston 8 is provided with a cylindrical first section 21 having a first cross-section, with a cylindrical second section 22 having a second cross-section greater than the first cross-section, and with a joining portion 23 connecting the first section 21 to the second section 22.

The first section 21 extends substantially longitudinally in the body 7 from the first end 15 of the braking piston 8 to the joining portion 23 situated at a second end 26 of the braking piston 8, which is an opposite end to its first end 15.

The first end 15 of the braking piston 8 is situated near the first aperture 16 formed in the body 7.

The second section 22 extends substantially opposite the first section 21 so as to form an annular groove 24 between the first section 21 and the second section 22.

The second section 22 is shorter here than the first section 21.

The annular groove 24 has a bottom 25 formed by the joining portion 23 and defines a space formed between the first and second sections 21 and 22.

It will be noted that the pressure chamber 17 is delimited on one side by the body 7, and on the other side by a major part of the perimeter of the second section 22, by the section of the joining portion 23 forming the bottom 25 of the annular groove 24 and by only part of the first section 21.

The braking piston 8 is furthermore provided, at its second end 26, with a lateral wall 27 turned towards the cavity 10.

The braking piston 8 is configured to move within the body 7 while maintaining the brake pressure chamber 17 fluid-tight thanks to a plurality of seals disposed between that braking piston 8 and inside edges of the body 7.

More specifically, the brake 2 comprises a first seal 28, here a lip seal, disposed between the first section 21 and the body 7, in a first accommodation 29 formed in that body 7.

The brake 2 comprises a second seal 30, here a lip seal, distinct from the first seal 28, and also disposed between the first section 21 and the body 7, in a second accommodation 31 formed in that body 7.

The first and second seals 28 and 30 are adjacently disposed, and the first and second accommodations 29 and 31 are formed here in a portion of the body 7 which is situated in the space formed by the annular groove 24, facing the second section 22.

The brake 2 comprises a third seal 32, here a lip seal, disposed between the second section 22 and the body 7, in a third accommodation 33 formed in that body 7.

The brake 2 comprises a fourth seal 34, here a lip seal, distinct from the third seal 32, and disposed between the second section 22 and the body 7, in a fourth accommodation 35 formed in that body 7.

The third and fourth seals 32 and 34 are adjacently disposed.

The brake 2 is configured such that the third and fourth seals 32 and 34 are to be found at least partially superposed relative to the first and second seals 28 and 30 which are accommodated at the location of the annular groove 24.

In particular, here, the first and third seals 28 and 32 are superposed relative to each other and the second and fourth seals 30 and 34 are longitudinally offset relative to each other.

The fourth seal 34, which is adjacent the third seal 32, is situated with a first side directed towards the joining portion 23, whereas the second seal 30, which is adjacent the first seal 28, is situated with a second side away from the first side and therefore remote from the joining portion 23.

It will be observed here that the lip or lips of the first and second seals 28 and 30 are turned towards the joining portion 23 whereas the lip or lips of the third and fourth seals 32 and 34 are turned away from the joining portion 23.

The first and third seals 28 and 32 are configured to form primary sealing of the pressure chamber 17; whereas the second and fourth seals 30 and 34 are configured to form a secondary seal of the pressure chamber 17.

The brake 2 comprises a first guide segment 36 for guiding the braking piston 8 relative to the body 7.

This first guide segment 36 is disposed between the first section 21 and the body 7, and accommodated here in a cavity 37 formed in the body 7.

The brake 2 comprises a second guide segment 38 for guiding the braking piston 8 relative to the body 7.

This second guide segment 38 is disposed between the second section 22 and the body 7, and accommodated in a cavity 39 also formed in the body 7.

As indicated above, the brake 2 is disposed in the body 7 and is configured to act on the braking member 6 via the braking linkage 5.

This braking member 6 here comprises a brake disk 40 (here viewed from above) mounted for example on a rail vehicle axle 41, or directly on the wheel to brake.

This braking member 6 further comprises two shoes 42 each provided with a lining 43 configured to be applied in contact with the disk 40 to reduce its rotational speed and therefore that of the wheel to brake, as well as a fastening eye 44 provided at the remote opposite location to the surface of the lining 43 that is configured to be applied to the disk brake 40.

The braking linkage 5 here comprises two deformable levers 45 each provided with an upper arm and a lower arm which are attached to each other.

Each arm of the levers 45 may be jointed to a central connector 46 via two pivots 47.

The lower arm of each deformable lever 45 is linked to one of the shoes 42 via its fastening eye 44.

The upper arm of each deformable lever 45 is linked to a respective joint 48, 49.

The braking linkage 5 receives the body 7 between the upper arms of the deformable levers 45, at the location of the joints 48 and 49. In other words, the body 7 is mounted on the braking linkage 5 via joints 48 and 49.

More specifically, the body 7 is rotatably mounted on the joint 49 which is attached to an end of the thrust rod 9 whereas it has a fixed mounting to the joint 48, which is directly attached to that body 7.

The braking linkage 5 also comprises a fastening lug 50 attached to the central connector 46 for the mounting of that braking linkage 5 on the rail vehicle; in order for the brake shoes 42 to be situated on respective opposite sides of the brake disk 40 (or of the rail vehicle wheel).

It should be noted that the coming towards each other of the joints 48 and 49 enables the shoes 42 to move apart from each other and that conversely, the separation of those joints 48 and 49 enables the shoes 42 to be to clamped onto the brake disk 40 (or onto the rail vehicle wheel).

As indicated above, the single pressure chamber 17 is connected to the network 3 for supply of hydraulic pressure agent or agents by the single distribution pipe 4 connected to the body 7 by its inlet aperture 19.

This network 3 here comprises a first source of hydraulic pressure agent 55 connected to a first inlet point 56 of the network 3 and a second source of hydraulic pressure agent 57 connected to a second inlet point 58 of the network 3.

These first and second sources of hydraulic pressure agent 55 and 56 are each configured to supply the pressure chamber 17 via the supply pipe 18.

The first source of hydraulic pressure agent 55 is a main supply source here, whereas the second source of hydraulic pressure agent 57 is what is referred to as a backup source which may be used in case of defect of the first source of hydraulic pressure agent 55.

As described below in more detail, the first and second sources of hydraulic pressure agent 55 and 57 are each configured to supply the pressure chamber 17 whatever the sealing state of the primary sealing, that is to say operational or defective.

The network 3 comprises a single distribution circuit 62 connected to the single distribution pipe 4 by an outlet point 63 of the network 3.

The network 3 comprises a primary branch 64 which is configured for conveying the hydraulic pressure agent coming from the first source of pressure agent 55, and which is provided with a pressure regulating device 65.

This primary branch 64 has a first section 66 connected by a first end to the first inlet point 56, and by a second end, which is an opposite end to the first end, to the pressure regulating device 65.

The network 3 comprises a first hydraulic distribution device 67 disposed in the distribution circuit 62, and connected to the primary branch 64 by a second section 68 connected by a first end to the pressure regulating device 65, and by a second end, which is an opposite end to the first end, to the first hydraulic distribution device 67.

The pressure regulating device 65 is configured here both to regulate the pressure of the hydraulic fluid provided by the first source of hydraulic pressure agent 55 and passing from the primary branch 64 to the distribution pipe 4 so as to permit the locomotion of the rail vehicle, and to drain the pressure chamber 17 of the hydraulic fluid coming from that pressure chamber 17 and passing from the distribution pipe 4 and to a venting reservoir 72.

For this, the pressure regulating device 65 is electrically controlled via an actuator 77 and is provided with a drainage section 78 connected, by a first end, to an outlet of the pressure regulating device 65, and by a second end, which is an opposite end to the first end, to a venting section 73 thanks to a branching-off point 79, which venting section 73 opens into the venting reservoir 72.

It will be noted that the first and second sources of hydraulic pressure agent 55 and 57 each deliver here a hydraulic pressure agent having a pressure value here equal to approximately 145 bars. However, only the pressure agent coming from the first source 55 is regulated by the pressure regulating device 65 at a regulated pressure value comprised here between 0 bar and approximately 110 bars.

The network 3 further comprises a secondary branch 69 configured for conveying the hydraulic pressure agent coming from the second source of pressure agent 57 by being directly connected, by a first end, to the second inlet point 58.

The network 3 comprises a second hydraulic distribution device 70 disposed in the distribution circuit 62 and connected to the secondary branch 69 by a second end, which is an opposite end to its first end.

The first hydraulic distribution device 67 is disposed between the second hydraulic distribution device 70 and the pressure regulating device 65.

The main branch 64 is supplied with hydraulic pressure agent by a hydraulic accumulator or by a hydraulic pump (which are not shown) forming the first source 55; and the secondary branch 69 is supplied with hydraulic pressure agent by a hydraulic accumulator or by a hydraulic pump (which are not shown) forming the second source 57.

The network 3 further comprises a venting device 71 disposed in the distribution circuit 62 and provided with a pressure threshold regulator comprising in particular a return member 80.

The venting device is configured to enable the venting of the pressure chamber 17 in case of emergency braking of the rail vehicle, to the venting reservoir 72, via the venting section 73 which is connected to the venting device 71.

The venting device 71 is not electrically controlled here but its pressure threshold regulator may be calibrated to a predetermined pressure value, for example comprised between approximately 15 bars and approximately 40 bars.

This enables the hydraulic fluid to be evacuated from the pressure chamber 17 until the predetermined pressure value (the calibration pressure) is attained in that chamber. Therefore, the application of the brake 2, by virtue of the displacement of the braking piston 8 from its resting position to its braking position under the action of the spring member 11, is controlled in order not to lock the wheels of the rail vehicle. In other words, this makes it possible to maintain a certain pressure level in the brake cylinder so as to limit the braking force applied.

The venting device 71 is furthermore connected to the outlet point 63 of the network 3, via a first section 74 of the distribution circuit 62, of which the first end is connected to the second hydraulic distribution device 70, and of which the second end, which is an opposite end to the first end, is connected to the outlet point 63; via also a second section 75 of the distribution circuit 62, of which the first end is connected to the first hydraulic distribution device 67, and of which the second end, which is an opposite end to the first end, is connected to the second hydraulic distribution device 70; and also via a third section 76 of the distribution circuit 62, of which the first end is connected to the venting device 71, and of which the second end, which is an opposite end to the first end, is connected to the first hydraulic distribution device 67.

The first and second hydraulic distribution devices 67 and 70 are each formed by a distributor provided with three apertures and a two-position slide which is electrically controlled by an actuator, and which is monostable.

A description will now be given in more detail of the first and second hydraulic distribution devices 67 and 70.

The distributor 67 comprises a movable slide 81 and an actuator 82 which is configured to move that slide 81.

The actuator 82 is configured to receive a control signal, here electrical.

The distributor 67 comprises a return spring 85 configured to move the slide 81 from a second position to a first position.

Figure 1:
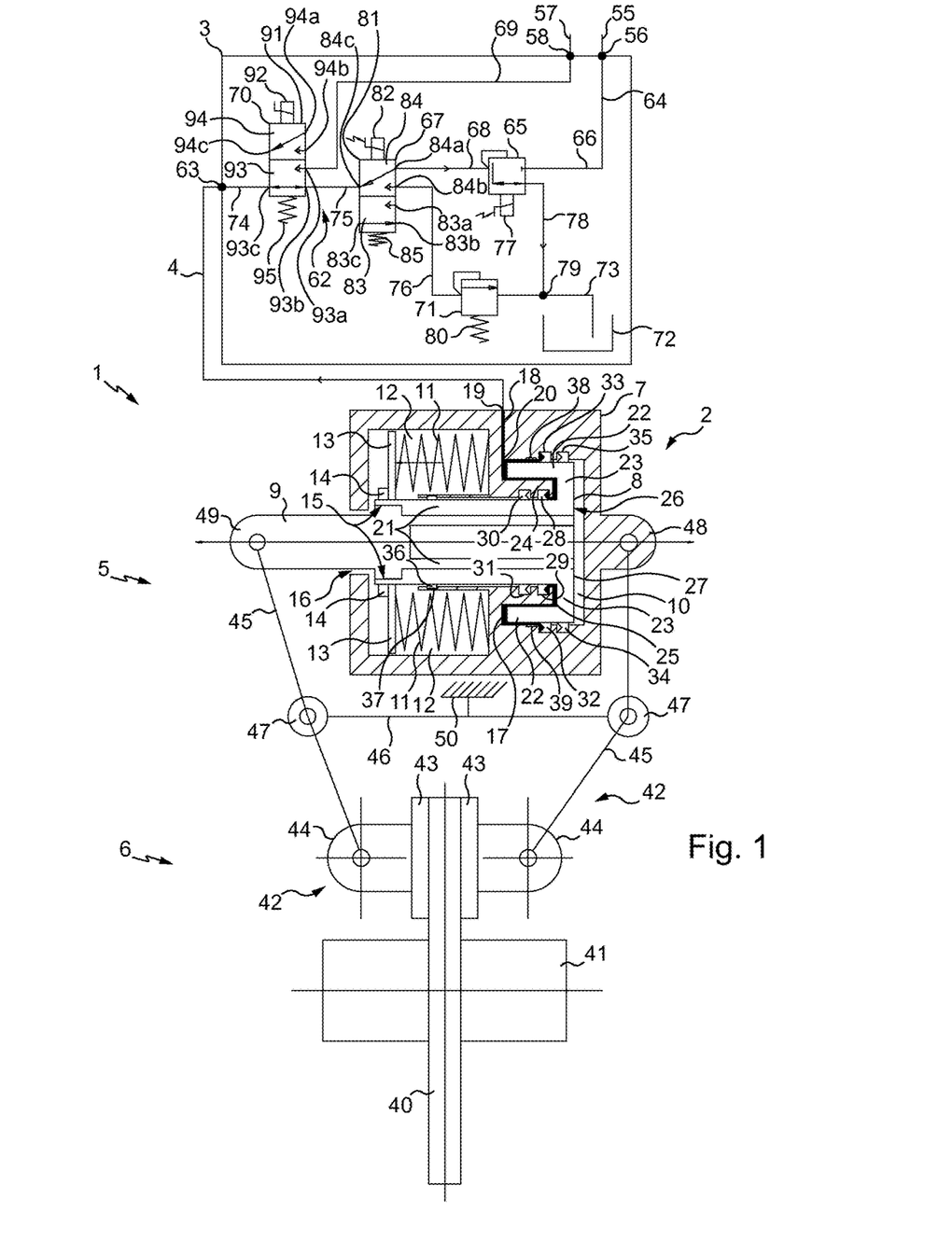
FIGS. 1 to 6 diagrammatically illustrate a rail vehicle braking system in accordance with the invention, in different operating configurations.

In FIG. 1, the distributor 67 is represented in its second position, which second position is not its position by default. The distributor 67 can be seen in its first position (position by default) in FIGS. 4 to 6.

In other words, the actuator 82 of the distributor 67 is configured to receive a non-null electrical signal to move the slide 81 from its first position to its second position.

The slide 81 comprises a first chamber 83 provided with three apertures 83a, 83b and 83c and a second chamber 84 also provided with three apertures 84a, 84b and 84c.

In each of the first and second positions of the slide 81, the second section 68 of the primary branch 64 is connected by its second end to one of the apertures 83a or 84a, the third section 76 of the distribution circuit 62 is connected by its second end to one of the apertures 83b or 84b, and the second section 75 of the distribution circuit 62 is connected by its first end to one of the apertures 83c or 84c.

The distributor 70 comprises a movable slide 91 and an actuator 92 which is configured to move that slide 91.

The actuator 92 is configured to receive a control signal, here electrical.

The distributor 70 comprises a return spring 95 configured to move the slide 91 from a second position to a first position.

In FIG. 1, the distributor 70 is represented in its first position, which first position is its position by default. The distributor 70 can be seen in its second position in FIGS. 5 to 6.

In other words, the actuator 92 of the distributor 70 is configured to receive a non-null electrical signal to move the slide 91 from its first position to its second position.

The slide 91 comprises a first chamber 93 provided with three apertures 93a, 93b and 93c and a second chamber 94 also provided with three apertures 94a, 94b and 94c.

In each of the first and second positions of the slide 91, the secondary branch 69 is connected by its second end to one of the apertures 93a or 94a, the second section 75 of the distribution circuit 62 is connected by its second end to one of the apertures 93b or 94b, and the first section 74 of the distribution circuit 62 is connected by its first end to one of the apertures 93c or 94c.

The operation of the rail vehicle braking system 1 will now be described with reference to FIGS. 1 to 6, which diagrammatically illustrate different configurations of the system 1.

In FIG. 1, the rail vehicle braking system 1 is in a service braking configuration in which the brake 2 is applied.

In this service braking configuration, the pressure chamber 17 is not supplied by the hydraulic pressure agent sources 55 and 57.

The spring member 11 is in tension, that is to say in its stable position in which it is uncompressed. The spring member 11 acts on the bearing flange 13 which itself maintains the braking piston 8 in its braking position.

The thrust rod 9 and the joint 49 are acted on by the braking piston 8, thereby moving apart the joints 48 and 49 and inducing the coming together of the shoes 42 and therefore the application of the linings 43 against the brake disk 40.

In this configuration of service braking, or of normal application of the brake 2 of the system 1, the levers 45 may be at least partially elastically deformed.

The pressure chamber 17 is here at least partially drained, or vented, by the displacement of the braking piston 8 from its resting position to its braking position.

The hydraulic fluid located in the pressure chamber 17, which initially comes from one of the first and second sources of pressure agent 55 and 57, becomes at least partly expelled from that pressure chamber 17 by the braking piston 8.

The hydraulic fluid passes from the pressure chamber 17 to the distribution pipe 4 through the supply pipe 18 and its outlet and inlet apertures 20 and 19, to reach the outlet point 63 of the network 3.

In this service braking configuration, the actuator 92 of the distributor 70 has received an electrical command that is null or sufficiently weak for its return spring 95 to return its slide 91 to its first position and thus to its position by default.

In this first position of the slide 91, the first chamber 93 of that slide 91 has its aperture 93c connected to the first end of the first section 74 of the distribution circuit 62, its aperture 93b connected to the second end of the second section 75 of the distribution circuit 62; and its aperture 93a blocked and connected to the second end of the secondary branch 69.

In this service braking configuration, the actuator 82 of the distributor 67 has received an electrical control signal that is non-null and sufficiently strong to move the slide 81 in opposition to its return spring 85 to place it in its second position.

In this second position of the slide 81, the first chamber 84 of that slide 81 has its aperture 84a connected to the second end of the second section 68 of the primary branch 64, its aperture 84b connected to the first end of the second section 75 of the distribution circuit 62; and its aperture 84b blocked and connected to the second end of the third branch 76 of the distribution circuit 62.

In this service braking configuration, the actuator 77 is electrically supplied to control the regulating device 65 such that the latter is configured to enable the drainage of the pressure chamber 17 and thereby evacuate the hydraulic fluid to the venting reservoir 72.

More specifically, the hydraulic fluid continues its passage from the outlet point 63 of the network 3 to the venting reservoir 72, by passing successively through the first and second sections 74 and 75 of the distribution circuit 62, through the second section 68 of the primary branch 64, through the regulating device 65, through the drainage section 78, then through the venting section 73 via the branching-off point 79.

Figure 2:
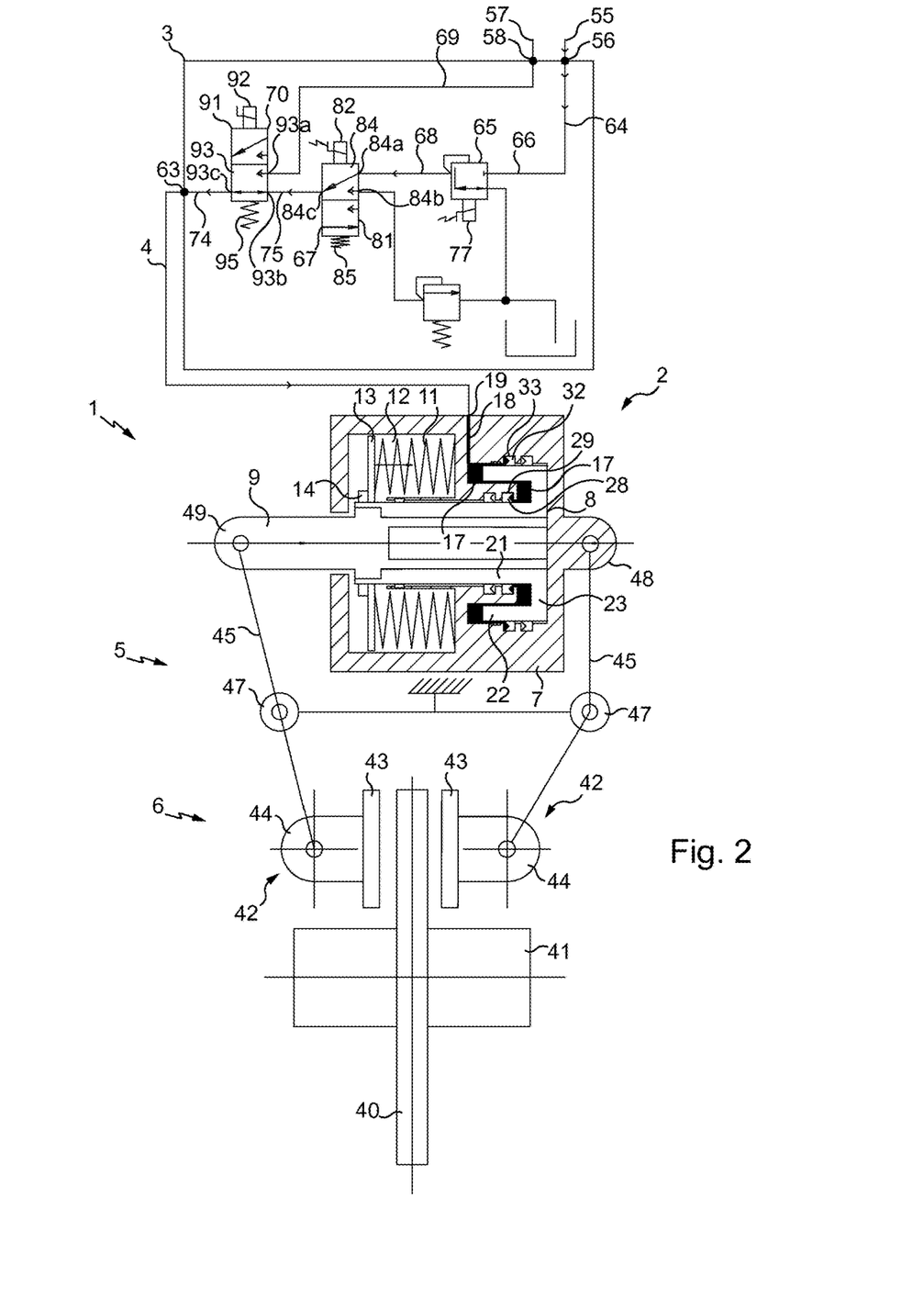

In FIG. 2, the rail vehicle braking system 1 is in a normal locomotion configuration in which the brake 2 is not applied and in which the primary sealing is operational here.

In this configuration of normal locomotion, the pressure chamber 17 is supplied by a hydraulic fluid coming from the first source of pressure agent 55 and passing along the primary branch 64, over a portion of the distribution circuit 62, and along the distribution pipe 4 to reach the body 7.

The pressure chamber 17 is fluid-tight here in particular by virtue of the first and third seals 28 and 32.

The hydraulic fluid enters the supply pipe 18 by its inlet aperture 19 and exits by its outlet aperture 20 to enter the pressure chamber 17, and thereby act on the braking piston 8 to move it from its braking position to its resting position.

In this normal locomotion configuration, the braking piston 8 drives the bearing flange 13 against the load of the spring member 11, which compresses.

The thrust rod 9 and the joint 49 are no longer acted on by the braking piston 8, thereby bringing together the joints 48 and 49 and inducing the moving apart of the shoes 42 and therefore the holding of the linings 43 at a distance from the brake disk 40, in order not to clamp the latter.

In this normal locomotion configuration, the actuator 77 is electrically supplied to control the regulating device 65 such that the latter is configured to regulate, to a predetermined value, the pressure value of the hydraulic fluid of the first source of pressure agent 55.

In this normal locomotion configuration, the distributor 67 is in the same position as in FIG. 1, that is to say in its second position, and the distributor 70 is also in the same position as in FIG. 1, that is to say in its first position.

The pressure-regulated hydraulic fluid of the first source of pressure agent 55 thus passes from the first inlet point 56 of the network 3 to the supply pipe 18 of the body 7, passing via the first section 66 of the primary branch 64, the regulating device 65, the second section 68 of the primary branch 64, the first and second sections 74 and 75 of the distribution circuit 62, the outlet point 63 and the distribution pipe 4.

It will be noted that the brake 2 and the regulating device 65 are configured in order for the hydraulic fluid to have a regulated pressure value to enable the braking piston 8 to be acted on in opposition to the spring member 11 until that piston reaches its resting position.

Figure 3:
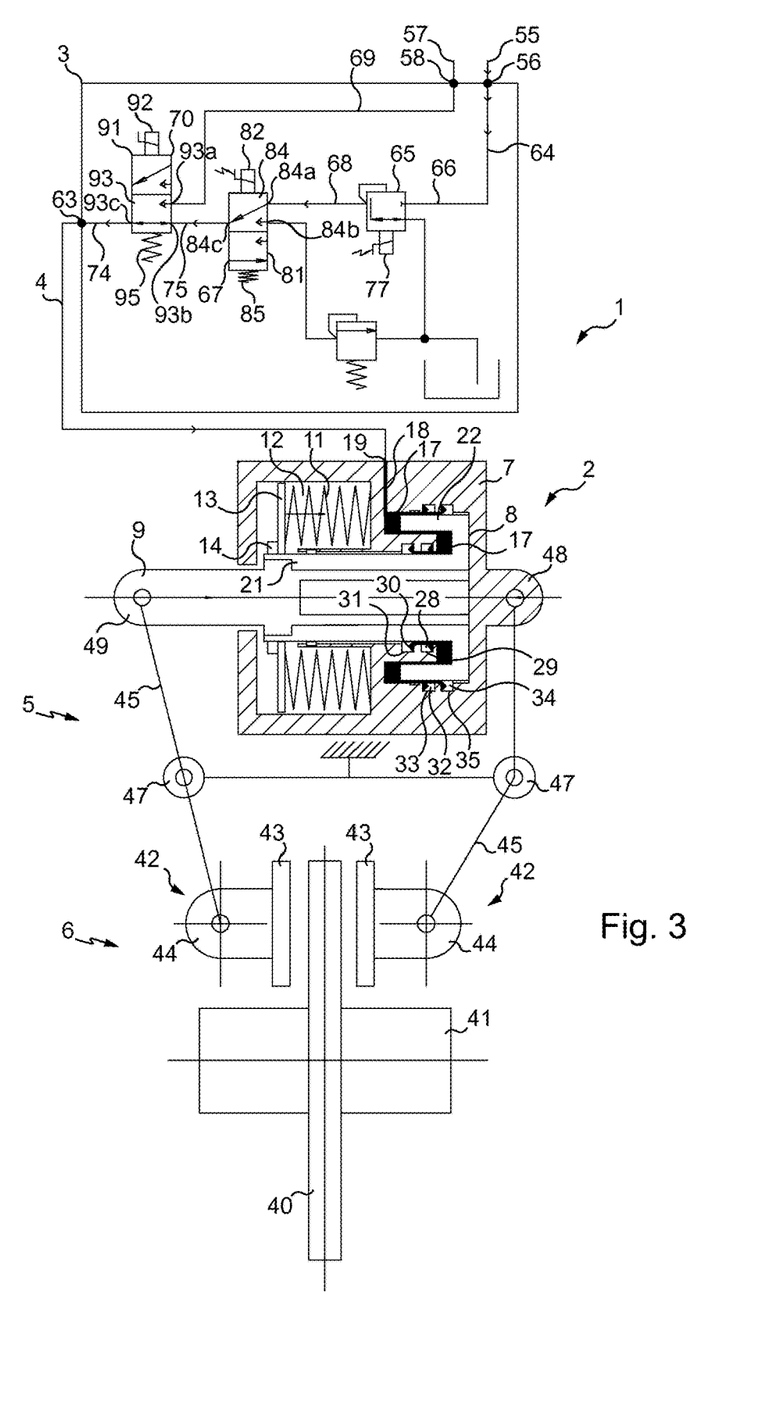

In FIG. 3, the rail vehicle braking system 1 is in a configuration of locomotion with a sealing defect, in which the brake 2 is not applied and in which the primary sealing is defective.

This means that the first seal 28 and/or the third seal 32 is/are defective; while the secondary sealing, referred to as backup sealing, is operational.

This configuration of locomotion with a sealing defect may or may not be detected by the rail vehicle. This means that the secondary sealing automatically substitutes for the primary sealing in case of a defect of the latter, on account of the configuration in particular of the seals 28, 30, 32 and 34 and of the braking piston 8.

In this configuration of locomotion with a sealing defect, the pressure chamber 17 continues to be supplied by a hydraulic fluid coming from the source of pressure agent 55.

The pressure chamber 17 is fluid-tight here by virtue of the second and fourth seals 30 and 34.

As for the normal locomotion configuration, the actuator 77 is electrically supplied in order to control the regulating device 65 such that the latter is configured to regulate, to a predetermined value, the hydraulic fluid pressure value of the first source of pressure agent 55; and the distributors 67 and 70 are in the same position as in FIG. 2, i.e. respectively in its second position and in its first position.

The pressure-regulated hydraulic fluid of the first source of pressure agent 55 thus passes from the first inlet point 56 of the network 3 to the supply pipe 18 of the body 7, passing via the first section 66 of the primary branch 64, the regulating device 65, the second section 68 of the primary branch 64, the first and second sections 74 and 75 of the distribution circuit 62, the outlet point 63 and the distribution pipe 4.

The pressure-regulated hydraulic fluid passes through the distribution pipe 4 then enters the supply pipe 18 by its inlet aperture 19 and exits by its outlet aperture 20 to enter the pressure chamber 17, and thereby act on the braking piston 8 to move it from its braking position to its resting position.

The braking piston 8 drives the bearing flange 13 against the load of the spring member 11, which compresses.

The thrust rod 9 and the joint 49 are no longer acted on by the braking piston 8, thereby bringing together the joints 48 and 49 and inducing the moving apart of the shoes 42 and therefore the holding of the linings 43 at a distance from the brake disk 40, in order not to clamp the latter.

It will be noted that the brake 2 and the regulating device 65 are configured in order for the hydraulic fluid to have a regulated pressure value which enables the braking piston 8 to be acted on in opposition to the spring member 11 until that piston reaches its resting position, despite the primary sealing defect, and more generally, regardless of whether it is the primary or the secondary sealing which ensures the delimitation of the pressure chamber 17.

Figure 4:
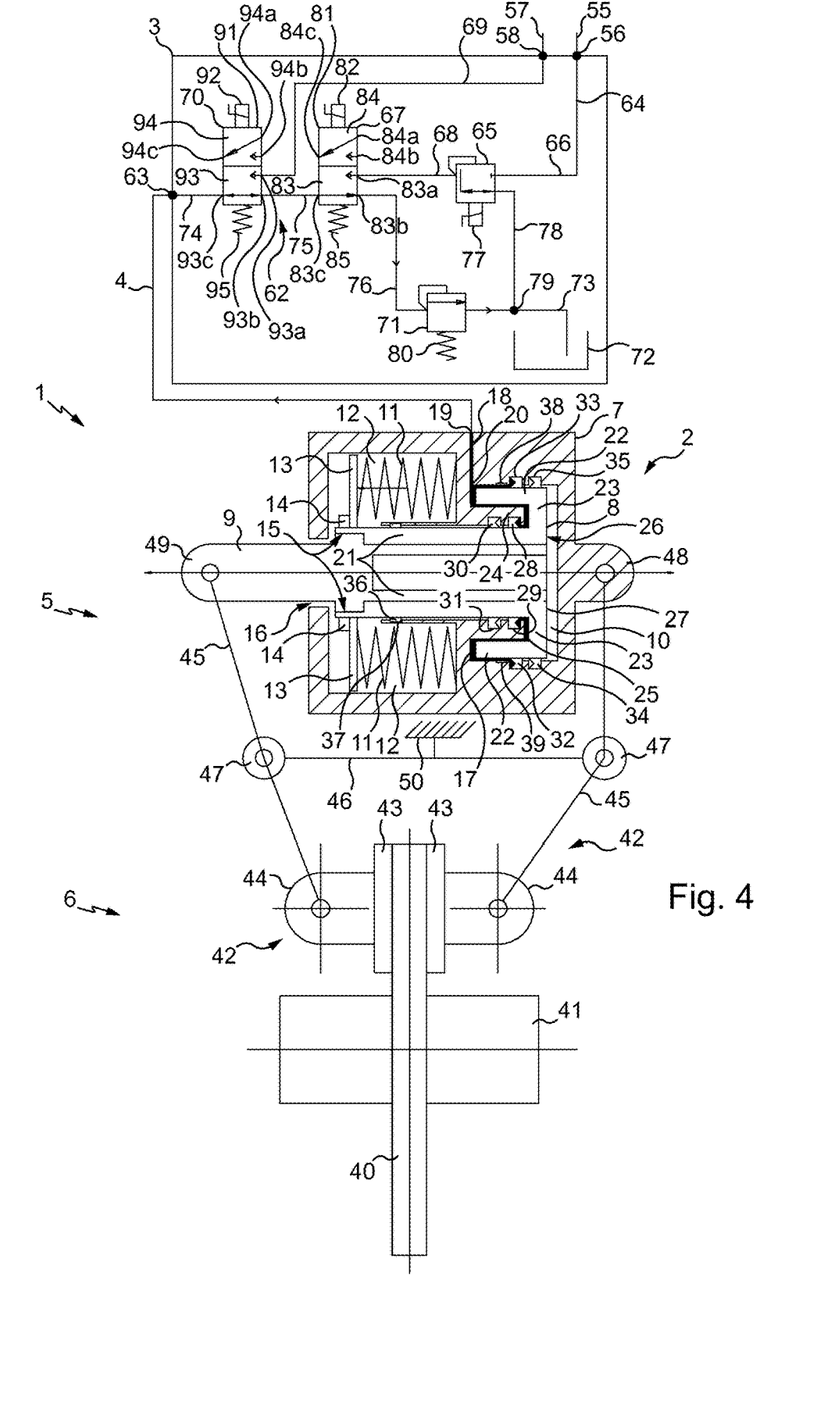

In FIG. 4, the rail vehicle braking system 1 is in an emergency braking configuration in which the brake 2 is applied, also referred to as safety or security braking configuration.

In this emergency braking configuration, the pressure chamber 17 is not supplied by the hydraulic pressure agent sources 55 and 57.

As in the service braking configuration (FIG. 1), the spring member 11 is in tension, that is to say in its stable position in which it is uncompressed. The spring member 11 acts on the bearing flange 13 which itself maintains the braking piston 8 in its braking position. The thrust rod 9 and the joint 49 are acted on by the braking piston 8, thereby moving apart the joints 48 and 49 and inducing the coming together of the shoes 42 and therefore the application of the linings 43 against the brake disk 40. The levers 45 may be at least partially elastically deformed.

The pressure chamber 17 is here at least partially vented, by the displacement of the braking piston 8 from its resting position to its braking position.

The hydraulic fluid located in the pressure chamber 17, which initially comes from one of the first and second sources of pressure agent 55 and 57, becomes at least partly expelled from that pressure chamber 17 by the braking piston 8.

The hydraulic fluid passes from the pressure chamber 17 to the distribution pipe 4 through the supply pipe 18 and its outlet and inlet apertures 20 and 19, to reach the outlet point 63 of the network 3.

In this emergency braking configuration, the distributor 70 is in the same position as in FIGS. 1 to 3, that is to say in its first position (by default); while the actuator 82 of the distributor 67 has now received an electrical command that is null or sufficiently weak for its return spring 85 to return its slide 81 to its first position and thus to its position by default.

In this first position of the slide 81, the first chamber 83 of that slide 81 has its aperture 93c connected to the first end of the second section 75 of the distribution circuit 62, its aperture 83b connected to the second end of the third section 76 of the distribution circuit 62; and its aperture 83a blocked and connected to the second end of the second section 68 of the primary branch 64.

In this emergency braking configuration, the actuator 77 is no longer electrically supplied such that the regulating device 65 is no longer controlled.

The venting of the pressure chamber 17 to the venting reservoir 72 is therefore carried out via the distribution circuit 62 and by virtue of the venting device 71.

More specifically, the hydraulic fluid passes from the outlet point 63 to the venting device 71 via the first, second and third sections 74, 75 and 77 of the distribution circuit 62, then is directed from that first venting device 71 to the venting reservoir 72 via the venting section 73.

The venting device 71 is not electrically controlled here but its pressure threshold regulator is calibrated to a predetermined pressure value so as to maintain a certain pressure level in the pressure chamber 17.

This makes it possible to control the displacement of the braking piston 8 from its resting position to its braking position under the action of the spring member 11 and therefore the application of the brake 2, with the aim of not locking the wheels of the rail vehicle.

Figure 5:
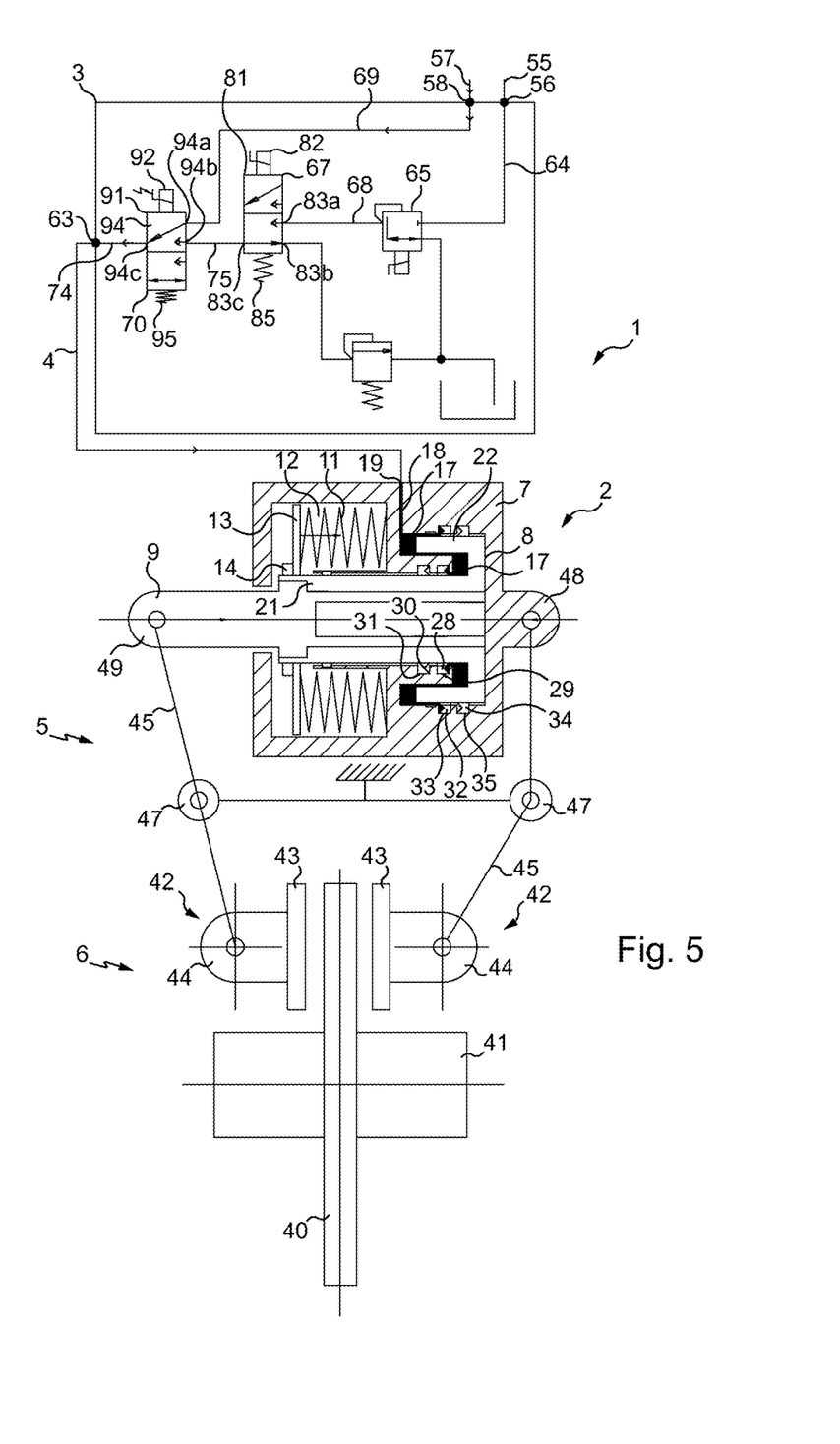

In FIG. 5, the rail vehicle braking system 1 is in a configuration of locomotion with a defect of the first source of hydraulic pressure agent in which the brake 2 is not applied, the primary sealing is operational here, but the first source of supply of hydraulic pressure agent 55 is defective.

If required, this first source of hydraulic pressure agent 55 is not capable of supplying the pressure chamber 17 with a hydraulic fluid and it is thus the second source of hydraulic pressure agent 57 which takes over and which supplies the pressure chamber 17 with a hydraulic fluid.

In this configuration of locomotion with a defect of the first source of hydraulic pressure agent, the pressure chamber 17 is supplied with a hydraulic fluid coming from the second source of pressure agent 57, referred to as backup source, which passes along the secondary branch 69, referred to as backup branch, along a portion of the distribution circuit 62, and along the distribution pipe 4 to the body 7.

As in the normal locomotion configuration illustrated in FIG. 2, the pressure chamber 17 is fluid-tight here in particular by virtue of the first and third seals 28 and 32.

The hydraulic fluid enters the supply pipe 18 by its inlet aperture 19 and exits by its outlet aperture 20 to enter the pressure chamber 17, and thereby act on the braking piston 8 to move it from its braking position to its resting position.

In this configuration of locomotion with a defect of the first source of hydraulic pressure agent, the braking piston 8 drives the bearing flange 13 against the load of the spring member 11, which compresses.

The thrust rod 9 and the joint 49 are no longer acted on by the braking piston 8, thereby bringing together the joints 48 and 49 and inducing the moving apart of the shoes 42 and therefore the holding of the linings 43 at a distance from the brake disk 40, in order not to clamp the latter.

In this configuration of locomotion with a defect of the first source of hydraulic pressure agent, the actuator 92 of the distributor 70 has received an electrical control signal that is non-null and sufficiently strong to move the slide 91 against its return spring 95 to place it in second position.

In this second position of the slide 91, the first chamber 94 of that slide 91 has its aperture 94a connected to the second end of the secondary branch 69, its aperture 94c connected to the first end of the first section 74 of the distribution circuit 62 and its aperture 94b blocked and connected to the second end of the second branch 75 of the distribution circuit 62.

In this configuration of locomotion with a defect of the first source of hydraulic pressure agent, the distributor 67 is in the same position as in FIG. 4, that is to say in its first position (position by default); and the actuator 77 is not electrically supplied such that the regulating device 65 is no longer controlled.

The hydraulic fluid with unregulated pressure coming from the second source of hydraulic pressure agent 57 passes from the second inlet point 58 of the network 3 to the supply pipe 18 of the body 7, via the secondary branch 69, the first section 74 of the distribution circuit 62, the outlet point 63 and the distribution pipe 4.

It will be noted that the brake 2 and the hydraulic accumulator or hydraulic pump supplying the hydraulic fluid of the second source of pressure agent 57 are configured in order for the hydraulic fluid to have a pressure value that enables the braking piston 8 to be acted on in opposition to the spring member 11 until that piston reaches its resting position.

Figure 6:
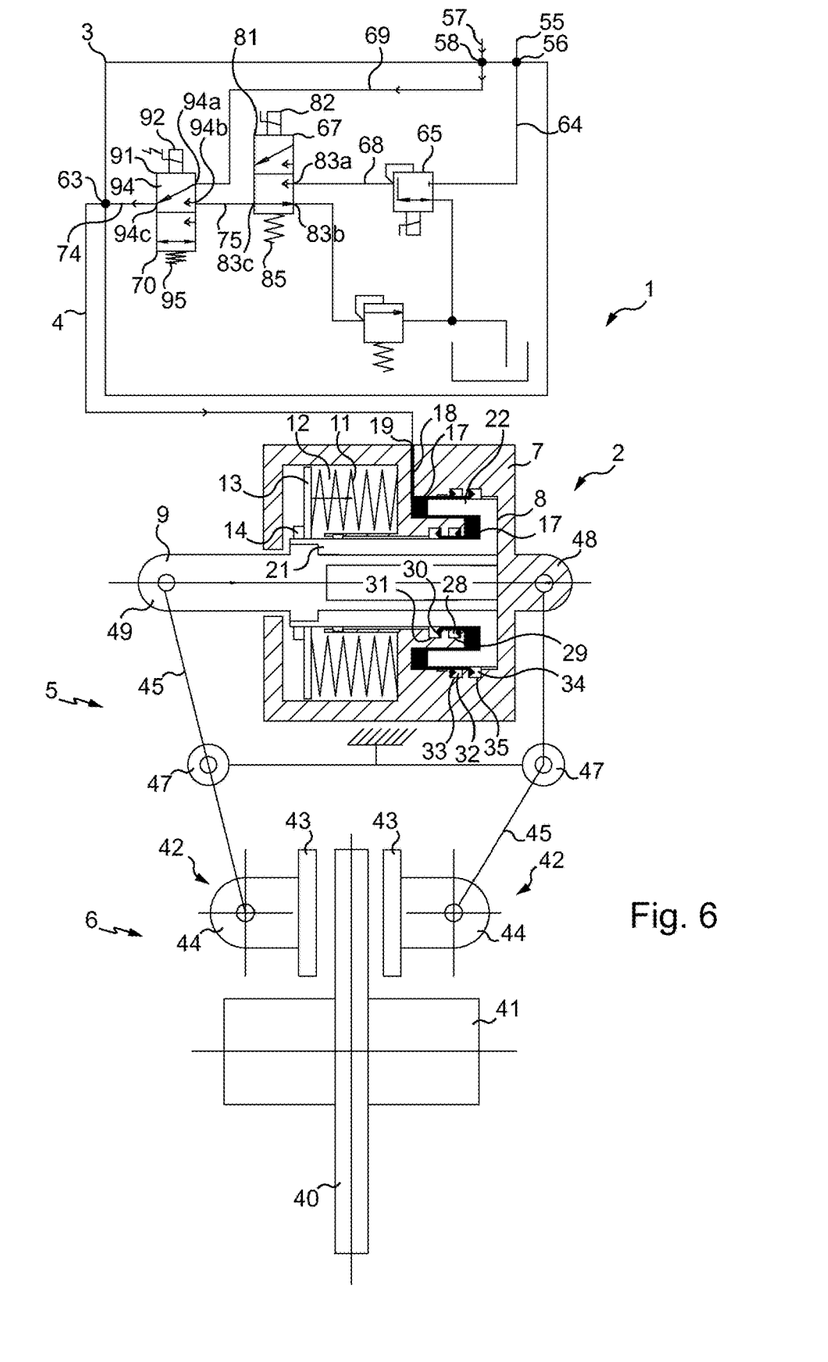

In FIG. 6, the rail vehicle braking system 1 is in a configuration of locomotion with a defect of the first source of hydraulic pressure agent and a sealing defect, in which the brake 2 is not applied and in which the primary sealing is defective.

As in the configuration of locomotion with a defect of the first source of hydraulic pressure agent illustrated in FIG. 5, this means that the first source of hydraulic pressure agent 55 is not capable of supplying the pressure chamber 17 with hydraulic fluid and it is therefore the second source of hydraulic pressure agent 57 which takes over and which supplies the pressure chamber 17 with hydraulic fluid.

What is more, as in the configuration of locomotion with a sealing defect illustrated in FIG. 3, this also means that the first seal 28 and/or the third seal 32 is/are defective; while the secondary sealing, referred to as backup sealing, is operational.

In this configuration of locomotion with a defect of the first source of hydraulic pressure agent and sealing defect, the defect of the primary sealing may or may not be detected by the rail vehicle. This means that the secondary sealing automatically substitutes for the primary sealing in case of a defect of the latter, on account of the configuration in particular of the seals 28, 30, 32 and 34 and of the braking piston 8.

In this configuration of locomotion with a defect of the first source of hydraulic pressure agent and a sealing defect, the pressure chamber 17 is supplied with a hydraulic fluid coming from the second source of pressure agent 57, referred to as backup source, which passes along the secondary branch 69, referred to as backup branch, along a portion of the distribution circuit 62, and along the distribution pipe 4 to the body 7.

The pressure chamber 17 is fluid-tight here by virtue of the second and fourth seals 30 and 34.

The hydraulic fluid enters the supply pipe 18 by its inlet aperture 19 and exits by its outlet aperture 20 to enter the pressure chamber 17, and thereby act on the braking piston 8 to move it from its braking position to its resting position.

In this configuration of locomotion with a defect of the first source of hydraulic pressure agent and a sealing defect, the braking piston 8 drives the bearing flange 13 against the load of the spring member 11, which compresses.

The thrust rod 9 and the joint 49 are no longer acted on by the braking piston 8, thereby bringing together the joints 48 and 49 and inducing the moving apart of the shoes 42 and therefore the holding of the linings 43 at a distance from the brake disk 40, in order not to clamp the latter.

In this configuration of locomotion with a defect of the first source of hydraulic pressure agent and a sealing defect, the distributors 67 and 70 are in the same positions as in FIG. 5, that is to say respectively in the first position (position by default) and in the second position; and the actuator 77 is not electrically supplied such that the regulating device 65 is not controlled.

The hydraulic fluid with unregulated pressure coming from the second source of hydraulic pressure agent 57 passes from the second inlet point 58 of the network 3 to the supply pipe 18 of the body 7, via the secondary branch 69, the first section 74 of the distribution circuit 62, the outlet point 63 and the distribution pipe 4.

It will be noted the brake 2 and the hydraulic accumulator or the hydraulic pump supplying the hydraulic fluid of the second source of pressure agent 57 are configured in order for the hydraulic fluid to have a pressure value which enables the braking piston 8 to be acted on in opposition to the spring member 11 until that piston reaches its resting position, despite the primary sealing defect, and more generally, regardless of whether it is the primary or the secondary sealing which ensures the delimitation of the pressure chamber 17.

Figure 7:
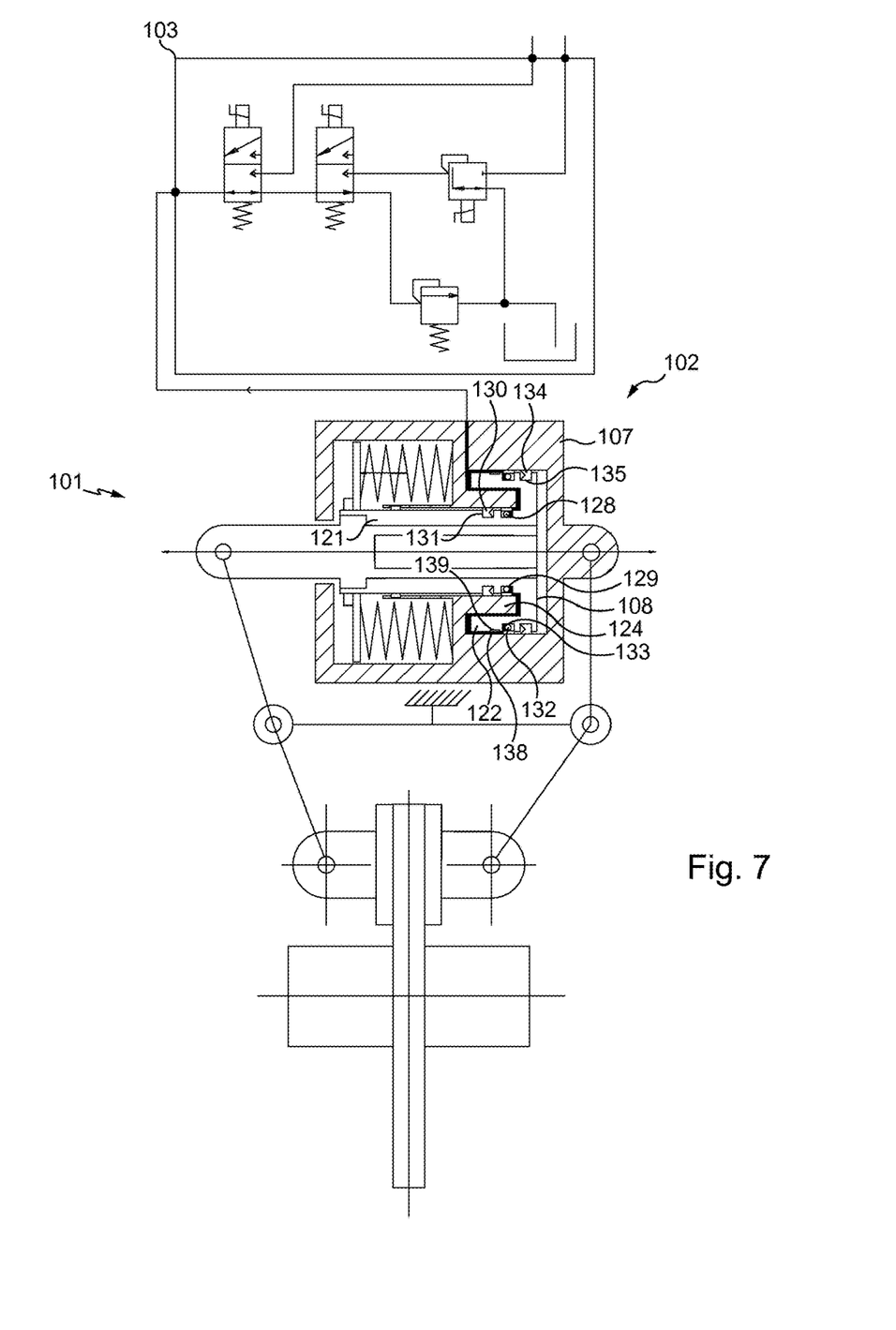
FIG. 7 diagrammatically represents a variant embodiment of the system visible in FIGS. 1 to 6.

FIG. 7 represents a variant embodiment of the rail vehicle braking system as described above.

Generally, the same reference numbers have been used for similar parts, but with the number 100 added.

The system 101 illustrated in FIG. 7 differs from the system 1 illustrated in FIGS. 1 to 6 in that the braking device 102 comprises a first seal 128 which is a composite seal rather than a lip seal, as well as a third seal 132 which is also a composite seal rather than a lip seal.

The system 101 also differs from the system 1 in that the first and second seals 128 and 130 are disposed between the body 107 and the first section 121 of the braking piston 108, at the location of the annular groove 124 and opposite the second section 122 of the braking piston 108, respectively in first and second accommodations 129 and 131 which are each provided here in the first section 121 rather than in the body 107; and in that the third and fourth seals 132 and 134 are disposed between the body 107 and that second section 122, respectively in third and fourth accommodations 133 and 135 which are each provided in the second section 122 rather than in the body 107.

The illustrated system 101 furthermore differs from the system 1 in that the second guide segment 138 is disposed between the body 107 and the second section 122, in a cavity 139 here provided in that second section 122 rather than in the body 107.

The supply network 103 is similar to the network 3 described above and the operation of the rail vehicle braking system 101 is also identical to that of the rail vehicle braking system 1 described above.

In variants that are not illustrated:
the pressure agent is pneumatic rather than hydraulic;
the braking piston has not only a first section and a second section of different cross-sections, but may also have one or more other sections, of which the cross-sections may be different from those of the first and second sections;
the primary sealing is made with first and third 'O' ring seals or lobed seals or compact seals rather than with lip seals or composite seals;
the secondary sealing is made with second and fourth composite seals, or 'O' ring seals, or lobed seals or compact seals rather than with lip seals;
the primary sealing is made with first and third seals that are not similar, that is to say belonging to different families of seals, which families are chosen from those of composite seals, lip seals, 'O' ring seals, lobed seals and what are referred to as compact seals;
the secondary sealing is made with second and fourth seals that are not similar, that is to say belonging to different families of seals, which families are chosen from those of composite seals, lip seals, 'O' ring seals, lobed seals and what are referred to as compact seals;
one of the first and second seals is situated in an accommodation provided in the first section of the braking piston, and the other of the first and second seals is situated in an accommodation provided in the body of the braking device;
one of the third and fourth seals is situated in an accommodation provided in the second section of the braking piston, and the other of the third and fourth seals is situated in an accommodation provided in the body of the braking device;
only the first seal is accommodated at the location of the annular groove, opposite the second section whereas the second seal is accommodated at a distance from the annular groove and is not opposite the second section;
the first and second seals are not accommodated at the location of the annular groove and opposite the second section, but are instead both accommodated at a distance from the joining portion;
the four seals are arranged such that the second and fourth seals are offset relative to the first and third seals, rather than being superposed relative to them;
the first and second seals and/or the third and fourth seals are not respectively adjacent but provided at a distance from each other;
the first and second guide segments are accommodated in cavities provided in the braking piston;
the first guide segment is accommodated in a cavity formed in the braking piston whereas the second guide segment is accommodated in a cavity provided in the body of the braking device;

the braking device is provided with several first guide segments over the first section of the braking piston and/or with several second guide segments over the second section of the braking piston;

the operation of resetting the braking device is carried out by actuating the distributors mechanically, hydraulically or pneumatically rather than electrically;

the distributors are bistable rather than monostable and have no return spring; and/or the rail vehicle braking system has a braking linkage different from that illustrated in the Figures, in particular the braking linkage comprises a block configured to act directly on a wheel of the rail vehicle, that block being directly jointed by a pivot type joint fastened to the thrust rod, a rigid lever fastened to the body of the system as well as a deformable lever fastened both to the rigid lever and to the joint on the block.

It should be noted more generally that the invention is not limited to the examples described and represented.

The invention claimed is:

1. A rail vehicle braking system for a rail vehicle with braking members having at least one lining or at least one block, said braking system comprising:
    a braking linkage configured to act on at least one said braking member, and
    a braking device comprising a body and an actuator which is movable relative to said body to act on said braking linkage;
    wherein said actuator comprises a single braking piston having a first section having a first cross-section and a second section having a second cross-section greater than said first cross-section,
    said braking piston delimiting with said body a single pressure chamber configured to be supplied by at least one source of pressure agent to put said braking piston in a resting position in which said braking linkage applies no force on said at least one braking member, whereby said braking device is not applied;
    said braking system further comprising:
    a first seal accommodated between said first section of said braking piston and said body,
    a second seal, distinct from said first seal, accommodated between said first section of said braking piston and said body,
    a third seal accommodated between said second section of said braking piston and said body, and
    a fourth seal, distinct from said third seal, accommodated between said second section of said braking piston and said body;
    said first and third seals being configured to form primary sealing of said pressure chamber and said second and fourth seals being configured to form secondary sealing of said pressure chamber.

2. The braking system according to claim 1, wherein said braking device further comprises:
    a spring member accommodated in a cavity formed in said body and
    a bearing flange mechanically connected both to said spring member and to said braking piston;
    said spring member being configured for placing, without being acted upon externally and via said bearing flange, said braking piston in a braking position in which said braking linkage applies a force on said at least one braking member, whereby said braking device is applied.

3. The braking system according to claim 1, wherein:
    said first portion of said braking piston extends substantially longitudinally in said body and is mechanically connected to said braking linkage, and
    said braking piston further comprises a joining portion connecting said first section to said second section, which second section extends substantially opposite said first section so as to form an annular groove between said first section and said second section, said annular groove having a bottom formed by said joining portion.

4. The braking system according to claim 3, wherein at least one of said first and second seals is accommodated at the annular groove and/or opposite said second section.

5. The braking system according to claim 4, wherein at least one of said third and fourth seals is located at least partially superposed relative to said at least one of the first and second seals which is accommodated at the location of the annular groove, at least when said braking piston is in resting position.

6. The braking system according to claim 5, wherein said first and third seals are at least partially superposed relative to each other and said second and fourth seals are offset longitudinally relative to each other.

7. The braking system according to claim 6, wherein said fourth seal is adjacent said third seal and accommodated with a first side directed towards said joining portion, whereas said second seal is adjacent said first seal and accommodated with a second side away from said first side.

8. The braking system according to claim 1, wherein said first and third seals are similar and belong to a first family of seals, said second and fourth seals are similar and belong to a second family of seals, distinct from or identical to said first family of seals.

9. The braking system according to claim 1, wherein at least one of said first, second, third and fourth seals is situated in an accommodation formed in said body of said braking device.

10. The braking system according to claim 1, wherein at least one of said first and second seals is situated in an accommodation formed in said first section of said braking piston, and/or at least one of said third and fourth seals is situated in an accommodation formed in said second section of said braking piston.

11. The braking system according to claim 1, further comprising at least one first guide segment disposed between said first section and said body, and accommodated in a cavity formed in said first section or in said body; and at least one second guide segment disposed between said second section and said body, and accommodated in a cavity formed in said second section or in said body.

12. The braking system according to claim 1, wherein said body is provided with a single supply pipe opening into said pressure chamber, and said braking system further comprises a first source of hydraulic pressure agent and a second source of hydraulic pressure agent which are each configured to supply said pressure chamber via said supply pipe.

13. The braking system according to claim 12, further comprising:
    a supply network for first and second sources of hydraulic pressure agent, the supply network comprising:
    a single distribution circuit and
    a single distribution pipe which is connected by a first end to said distribution circuit, and by a second end, which is an opposite end to said first end, to said supply pipe of said body;

said supply network further comprising:
- a primary branch configured for conveying a hydraulic pressure agent coming from said first source of pressure agent and provided with a pressure regulating device,
- a first hydraulic distribution device disposed in said distribution circuit and connected to said primary branch,
- a secondary branch configured for conveying a hydraulic pressure agent from said second source of pressure agent,
- a second hydraulic distribution device disposed in said distribution circuit and connected to said secondary branch;
- said first hydraulic distribution device being disposed between said second hydraulic distribution device and said pressure regulating device.

14. The braking system according to claim 13, wherein said first and second hydraulic distribution devices, are each formed by a distributor provided with three apertures and a two-position slide which is electrically controlled by an actuator.

15. The braking system according to claim 13, wherein said main branch and/or said secondary branch are each supplied with hydraulic pressure agent by a hydraulic accumulator or by a hydraulic pump.

16. The braking system according to claim 2, wherein:
- said first portion of said braking piston extends substantially longitudinally in said body and is mechanically connected to said braking linkage, and
- said braking piston further comprises a joining portion connecting said first section to said second section, which second section extends substantially opposite said first section so as to form an annular groove between said first section and said second section, said annular groove having a bottom formed by said joining portion.

17. The braking system of claim 8, wherein said first and second families of seals are selected from a group consisting of composite seals, lip seals, 'O'-rings, lobed seals and compact seals.

18. The braking system according to claim 2, wherein said first and third seals are similar and belong to a first family of seals, said second and fourth seals are similar and belong to a second family of seals, distinct from or identical to said first family of seals.

19. The braking system according to claim 3, wherein said first and third seals are similar and belong to a first family of seals, said second and fourth seals are similar and belong to a second family of seals, distinct from or identical to said first family of seals.

20. The braking system according to claim 4, wherein said first and third seals are similar and belong to a first family of seals, said second and fourth seals are similar and belong to a second family of seals, distinct from or identical to said first family of seals.

* * * * *